C. B. GRAY.
MACHINE FOR CUTTING SHEET METAL.
APPLICATION FILED DEC. 13, 1912. RENEWED OCT. 28, 1913.
1,098,376.
Patented June 2, 1914.
4 SHEETS—SHEET 1.
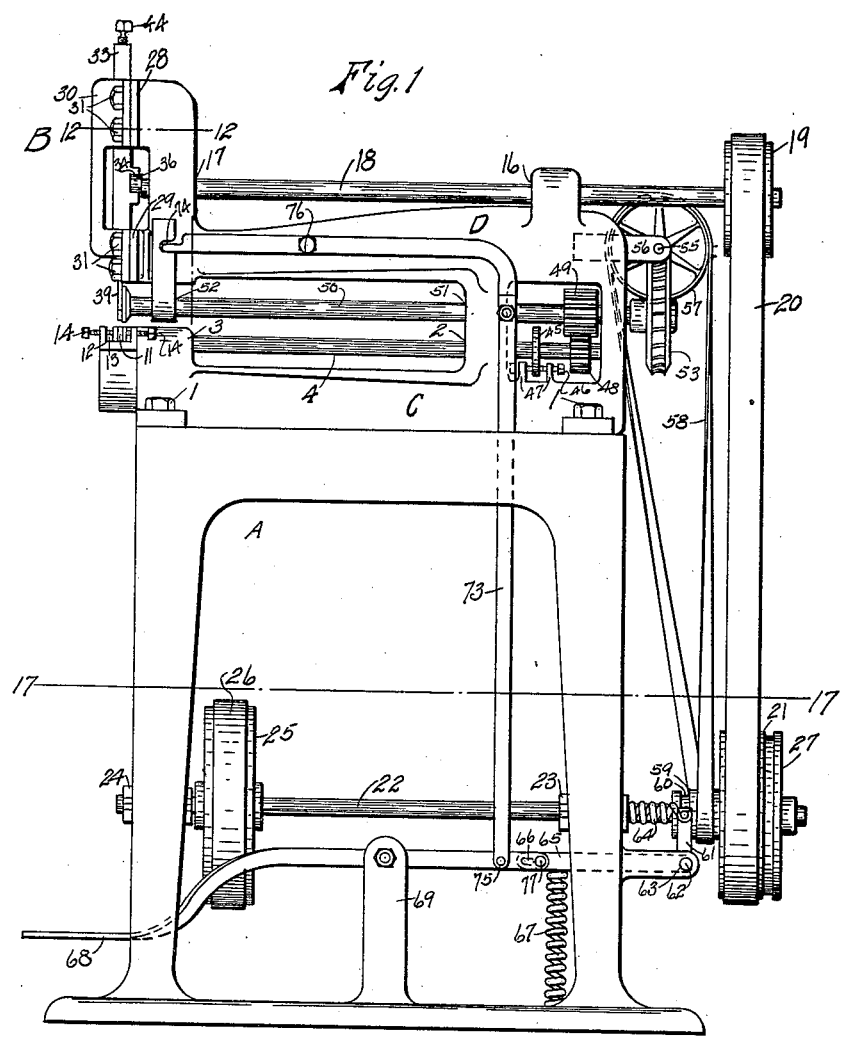
WITNESSES
INVENTOR
Charles B. Gray
By Cyrus Kehr
Attorney C. B. GRAY.
MACHINE FOR CUTTING SHEET METAL.
APPLICATION FILED DEC. 13, 1912. RENEWED OCT. 28, 1913.
1,098,376.
Patented June 2, 1914.
4 SHEETS—SHEET 2.
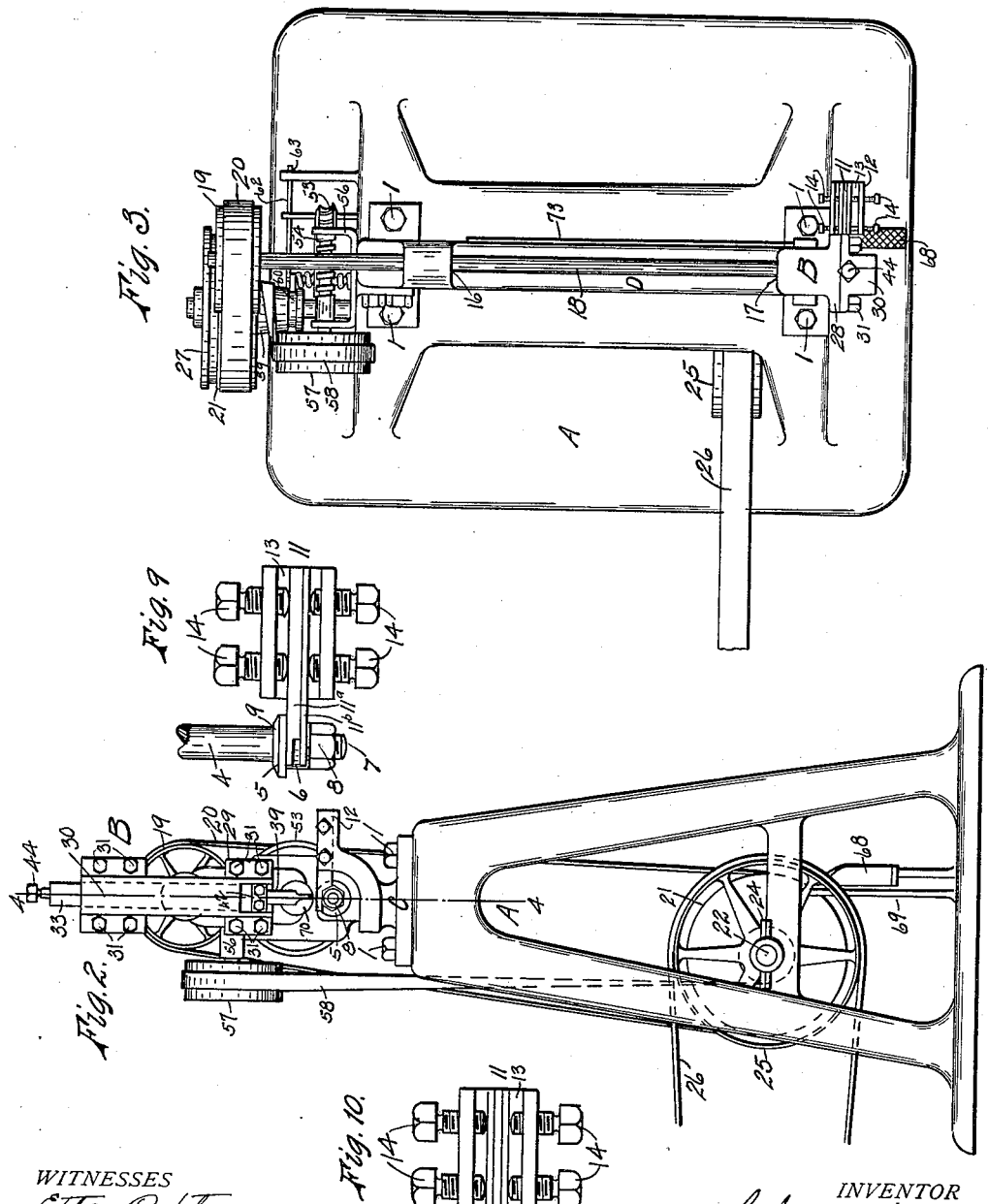
WITNESSES
INVENTOR
Charles B. Gray
By Cyrus Kehr
Attorney

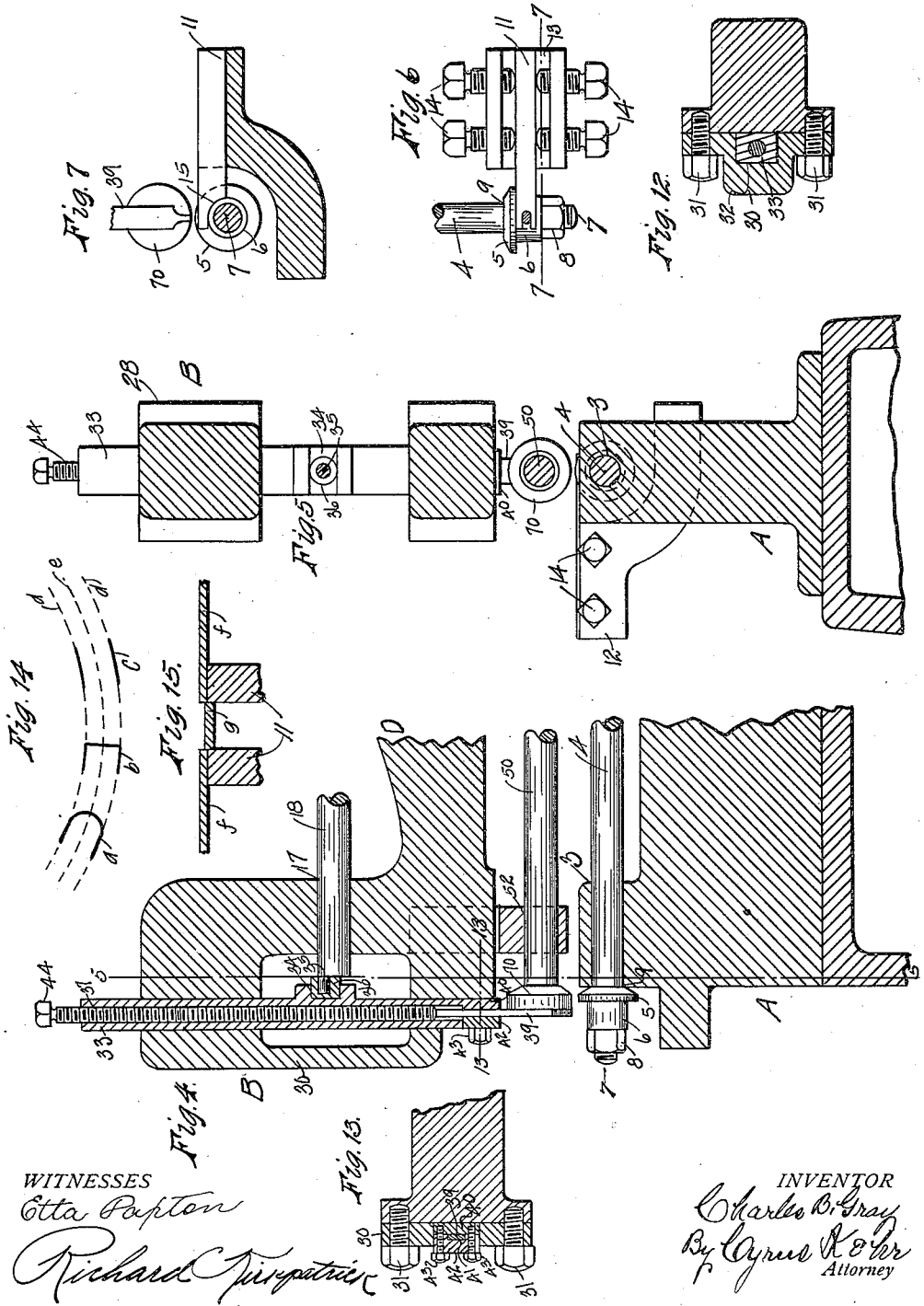

C. B. GRAY.
MACHINE FOR CUTTING SHEET METAL.
APPLICATION FILED DEC. 13, 1912. RENEWED OCT. 28, 1913.
1,098,376.
Patented June 2, 1914.
4 SHEETS—SHEET 4.
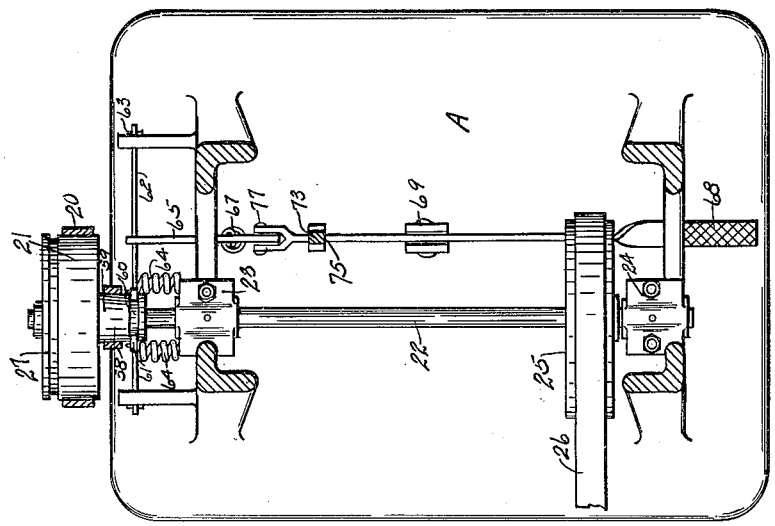
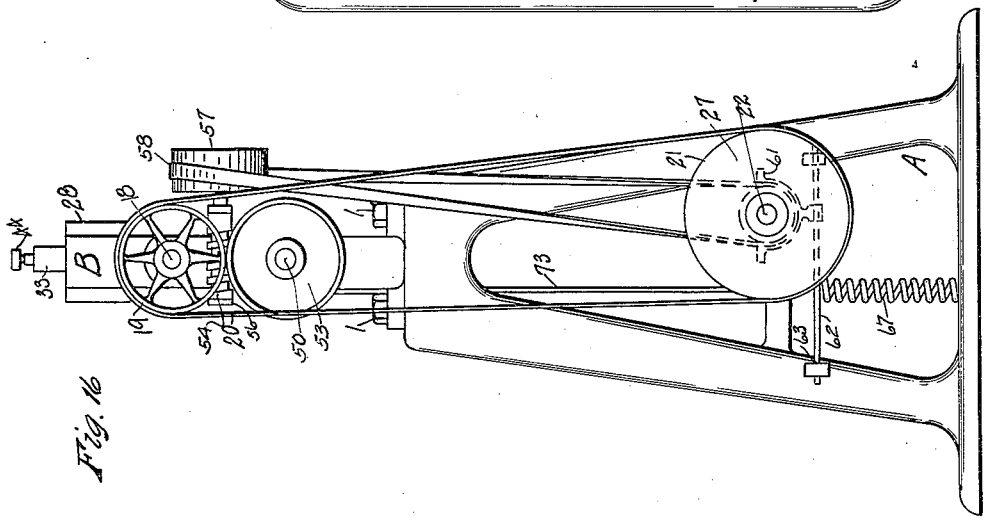
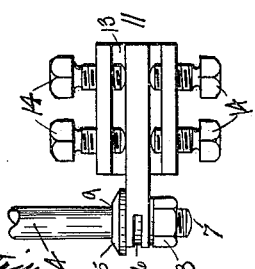
WITNESSES
Etta Papton
Richard Finspatin
INVENTOR
Charles B. Gray
By Cyrus Kehr
Attorney

UNITED STATES PATENT OFFICE.

CHARLES B. GRAY, OF KNOXVILLE, TENNESSEE.

MACHINE FOR CUTTING SHEET METAL.

1,098,376.   Specification of Letters Patent.   Patented June 2, 1914.

Application filed December 13, 1912, Serial No. 736,557. Renewed October 28, 1913. Serial No. 797,893.

*To all whom it may concern:*

Be it known that I, CHARLES B. GRAY, a citizen of the United States, residing at Knoxville, in the county of Knox and State of Tennessee, have invented a new and useful Improvement in Machines for Cutting Sheet Metal, of which the following is a specification, reference being had to the accompanying drawing.

My improvement relates particularly to machines designed for cutting sheet metal by a step by step method.

The object of the improvement is to provide a machine for rapidly cutting sheets of metal along lines which are curved or change course so frequently as to prevent the use of shearing machines and to make the use of hand shears difficult.

My improved machine comprises means for holding and feeding the sheet and means for cutting through the sheet, which means coöperate in such manner as to allow the guiding of a sheet through the mechanism in the same manner as cloth is ordinarily guided through a sewing machine for stitching along any desired course. In the form of the machine shown by the drawings, the feeding and cutting mechanism are closely associated, the feeding members engaging the upper and the lower faces of the sheet close to the cutting point, as will hereinafter appear; said machine, in the form shown, comprising as its principal elements a lower stationary cutter, a lower rotary feeding member, and a reciprocable cutter working in conjunction with said stationary cutter, and an upper feeding member.

In the accompanying drawings, Figure 1 is a front elevation of a machine embodying my improvement; Fig. 2 is an elevation looking toward the right in Fig. 1; Fig. 3 is a plan of the machine as shown in Fig. 1, the front of the machine being toward the right; Fig. 4 is a detail section on the line, 4—4, of Fig. 2, looking toward the left, portions being left uncut; Fig. 5 is a section on the line, 5—5, of Fig. 4 looking toward the left; Fig. 6 is a detail of the lower cutting and feeding members; Fig. 7 is an upright section on the line, 7—7, of Fig. 6; Figs. 8, 9, and 10 are views similar to Fig. 6 showing other forms of the lower cutting member; Fig. 11 is a transverse, upright section at the right of one of the bearings of the feed roller shaft, the view being toward the left of said bearing as viewed in Fig. 1; Fig. 12 is a section on the line, 12—12, of Fig. 1; Fig. 13 is a section on the line 13—13, of Fig. 4; Figs. 14 and 15 illustrate the cutting operation; Fig. 16 is an elevation of the right-hand end of the machine; Fig. 17 is a section on the line, 17—17, of Fig. 1.

Referring to said drawings, A is the frame and B is the "head" of the machine. This resembles the head of a sewing machine. Bolts, 1, 1, secure the head to the frame. Said head has a base, C, and an arm, D, which are similar to the corresponding parts of a sewing machine head. The sheet to be cut is moved horizontally through the space between the base, C, and the arm, D, such movement being automatic and from front to rear the same as cloth is fed through an ordinary sewing machine. In the form shown in the drawings, the feeding mechanism consists of a roller bearing against the bottom of the sheet and an upper roller bearing against the upper face of the sheet, the lower roller being mounted on a horizontal rotary shaft which is parallel to the lower shaft. These rollers rotate so as to carry rearward the portions thereof which bear against the sheet, whereby the sheet is carried rearward. Near these feed rollers there is an upper upright reciprocatory cutter which is actuated by an upper, horizontal shaft, in the same manner as the needle-bar of a sewing machine is ordinarily reciprocated by the needle-bar drive shaft. Said reciprocatory cutter works in conjunction with a lower stationary cutter, the cutting edge of which is at the level of a plane which is horizontal and tangential to the upper portion of the perimeter of the lower feed roller. The cutting edges of the cutters extend crosswise of and also in or approximately in the direction of the course of the sheet. This, it will be observed, involves cutting out a portion of the sheet, such portion having a width according to the space between the lateral portions of the cutting edges, and portions cut out of the sheet forming small chips or fragments.

The head, B, has bearings, 2 and 3, which receive the roller shaft, 4. The left hand end of said shaft projects through the bearing, 3, and is there formed into a neck, 7, to receive the roller, 5, and a ring or washer, 6. A nut, 8, is threaded to said shaft for driving said roller and said ring toward the adjacent bearing, 4, and the shoulder, 9, at the inner end of said neck. The stationary cutter, 11, is set horizontally in a bracket, 12, located forward of the lower roller. Said bracket has an upright channel, 13, on the bottom of which said cutter rests, and from each side of the channel, two set-bolts, 14, extend horizontally through the bracket into the channel. The inner ends of said bolts bear against the cutter and bind the latter immovably. The bolts at one side may be retracted and the other driven forward, as may be needed to properly adjust the cutter transversely with reference to the reciprocatory cutter. This cutter is extended rearward until its cutting edge is substantially above the axis of the shaft, 4, or at the highest portion of the roller, 5. The rear portion of the cutter may be made to rest on the washer, 6, as shown in Fig. 7. If the main portion of the cutter extends below the level of the highest portion of said washer, the lower portion of the rear end of the cutter may be cut away to conform to the washer, as shown at 15 in Fig. 7.

In the upper portion of the head, B, are two bearings, 16 and 17, the latter being in the outer portion of the arm, D. A rotary shaft, 18, rests in said bearings and has at its right hand end a band wheel, 19, which receives a belt, 20, which also surrounds a pulley, 21, which is on a drive shaft, 22, resting in bearings, 23 and 24, in the frame, A. On the shaft, 22, is a pulley, 25, which receives power through the belt, 26, which leads to any source of power. Said belt, pulley, and shaft are driven constantly. The pulley, 21, is an outer friction clutch member loose on the shaft, 22. An inner friction clutch member, 27, is immovable on the shaft, 22, and extends into the clutch member, 21. The pulley or outer clutch member, 21, will rotate only when it is pressed against the inner clutch member, 27, by the means to be hereinafter described. Above the bearing, 17, the arm, D, has a face, 28, which is upright and directed toward the left. Below said bearing is a similar face, 29, in the same plane as the face, 28, the middle of said arm being extended toward the left so as to bring the plane of said faces approximately even with the adjacent end of the shaft, 18. A plate, 30, is secured against both of said faces by means of screw bolts, 31. In the face of said plane which rests against the faces, 28 and 29, is formed an upright channel, 32, (Fig. 12) to receive a reciprocatory cutter bar, 33. On the right hand side of the cutter bar is a transverse channel, 34, into which extends a crank, 35. An anti-friction roller, 36, surrounds said crank and is of proper size to fill said channel; and said channel is long enough to retain said roller and crank during the rotation of the latter. It will be seen that during such rotation the cutter bar is reciprocated in the upright channel, 32, through a distance equal to twice the length of the crank.

A threaded passage, 37, extends lengthwise through the cutter bar. The reciprocatory cutter, 39, extends upward into said passage. At the right of said cutter, the cutter bar has a downward extension, 40, against which said cutter lies. A clamping plate, 42, having a channel, 41, to receive the cutter, extends across the cutter bar and said extension and is secured to the latter by means of screw bolts, 43. By tightening said bolts, the cutter is securely clamped to the cutter bar. To provide for upright adjustment and an abutment against which the upper end of the cutter may bear, a screw, 44, is driven downward lengthwise through the cutter bar to and against the upper end of the cutter, 39. To set the cutter so as to bring its lower end to a precise height, the bolts, 43, are loosened, the screw, 44, retracted, the cutter pushed upward higher than its working position, and the screw, 44, then slowly driven downward, whereby the cutter is slowly driven downward, the turning of the screw, 44, being stopped when the lower end of the cutter reaches precisely the desired position. The screw bolts, 43, are then tightened.

From the foregoing description it will be seen that no provision is made for adjusting the reciprocatory cutter from right to left. This is unnecessary, because, as already described, provision is made for adjusting the stationary cutter rightward and leftward. Provision is also made for moving the lower roller, 5, rightward and leftward, in order that it may be set close to the stationary cutter after the latter has been set and secured in its precise position. For this purpose, an annular flange, 45, is formed or placed on the shaft, 4, and set-bolts, 46, rest in standards, 47, at opposite sides of said flange and bear against the latter. By retracting one of said bolts and turning the other forward, said flange and shaft and the roller, 5, are correspondingly moved in the same direction.

At the lower end of the reciprocatory cutter, its forward portion is rounded so as to form a U-shape cutting edge, and the rear portion of the stationary cutter, 11, is correspondingly cut out so as to present a corresponding cutting edge to work in conjunction with the cutting edge of the reciprocatory cutter. (See Fig. 6.) In Fig. 8, the rear portion of the stationary cutter has two cutting edges parallel to the length of the cutter and a straight cutting edge transverse to and connecting said parallel edges. When this form is used, the forward portion of the reciprocatory cutter is correspondingly formed with two lateral edges and a forward transverse edge. In Fig. 9, the cutting edges are the same as in Fig. 8; but the cutter consists of two bars or plates, 11ª and 11ᵇ, laid side by side and the latter having one of the lateral cutting edges and the former having a lateral and also the transverse cutting edge.

In Fig. 10, the cutter, 11, consists of three bars or plates lying flatwise against each other, the bar or plate, 11ª, being in the middle and having the transverse cutting edge and the bars or plates, 11ᵇ and 11ᶜ, lying at each side of the plate, 11ª, and each having one of the lateral cutting edges.

The cutting edge or edges of the stationary cutter are to be brought approximately to the level of the highest portion of the lower roll, in order that the shearing action between the stationary cutter and reciprocatory cutter may take place in the plane of the sheet resting on said roll.

Inasmuch as each stroke of the reciprocatory cutter is to advance the cut through only a short distance in the sheet, the latter is to be fed forward only a short distance, and accordingly the shaft, 4, bearing the lower roller, 5, is to rotate slowly with reference to the operation of the cutter bar shaft, 18.

The shaft, 4, receives motion from the drive shaft, 22, as follows: On the roller shaft, 4, is a spur gear wheel, 48, meshing with a spur gear wheel, 49, on the feed shaft, 50, which shaft rests in bearings, 51 and 52. On said shaft is a worm wheel, 53, meshing with a worm, 54, on a shaft, 55, resting in bearings, 56, and having at one end a pulley, 57. A belt, 58, surrounds said pulley and a smaller pulley, 59, which is a portion of the outer clutch member, 21. By making the pulley, 59, smaller than the pulley, 57, and by using the worm gearing, the motion transmitted from the drive shaft, 22, to the cutter roller shaft, 4, is reduced. The pulley, 19, is made smaller than the pulley, 21, whereby the motion transmitted from the shaft, 22, to the shaft, 18, is increased. The clutch member, 21, has a groove, 60, which receives a fork, 61, on the rock-shaft, 62, which rests in bearings, 63. Two contracting coiled springs, 64, are joined by one end to said fork and by the other end to the frame at the left of said fork and tend to turn said fork leftward so as to draw the outer clutch member away from the inner clutch member. An arm, 65, extends horizontally leftward from the rock-shaft. A contracting coiled spring, 67, is joined by its upper end to the arm, 65, and by its lower end to the frame, so that said spring normally draws said arm downward, whereby the rock-shaft, 62, is turned, and the clutch fork and the outer clutch member are moved away from the inner clutch member. A foot lever, 68, is pivoted between its ends to a standard, 69, and coupled by one end to the horizontal rock-shaft arm, 65, by a bolt, 77, while its other end extends leftward into a position to be conveniently reached by the foot of the operator standing in front of the left hand portion of the machine. The left-hand end of the arm, 65, has a slot, 66, to allow play for the bolt, 77, at the coupling to the foot lever.

From the foregoing it will be seen that when the foot lever is left free, the action of the springs, 64, and 67, draws the outer clutch member away from the inner clutch member, so that the outer clutch member does not rotate. This puts the shafts, 4 and 18, and the lower roller and the reciprocatory cutter at rest. When it is desired to put said parts into motion, the left hand portion of the foot lever is pressed downward with sufficient force to overcome the springs and to engage the outer clutch member with the inner clutch member. When it is desired to stop the operation, the pressure of the foot is removed from the foot lever, whereupon the spring automatically moves the outer clutch member away from the inner clutch member, as already described.

The feeding of the sheet of material to be cut is accomplished by the coöperation of the lower feed roller and the upper feel roller, 70. The sheet is guided by the hands of the operator. The feed shaft, 50, is directly above the roller shaft, 4, and the spur gear wheels, 48 and 49, have the same number of teeth so that said shafts rotate at the same velocity but in opposite directions. The transmission from the drive shaft, 22, is such as to cause the engaging portions of said spur gear wheels and the adjacent faces of said shafts to move rearward. On the shaft, 50, above the inner cutter roller, 5, is a feed roller, 70, the left hand face of which is set to easily clear but give lateral support to the reciprocatory cutter. The upper feed roller, 70, is of the same diameter as the lower feed roller, 5, in order that their peripheries may travel in unison, and the space between said rollers is sufficient for the admission of a sheet of material which is to be cut. In order to adapt these rollers to engage and release the sheet and to take sheets of different thicknesses, within suitable range, the upper fed roller is made adjustable toward and from the lower feed roller. For this purpose, the bearing, 52, is formed for limited up and down adjustment. Arms, 71, extend upward from each side of the bearing, 52, and along the side faces of the arm, D, in channels, 72, so that said bearing may move up and down and be guided in such movement by the arm, D. Such up and down movement of said bearing imparts corresponding movement to the adjacent end of the feed shaft and the upper feed roller. As above indicated, this movement is to be through limited range to allow for engaging and releasing and to adapt the mechanism to sheets of material varying in thickness to a limited extent. A lever, 73, has one end coupled to one of the arms, 71, by entering a notch, 74, in the bearing, and has its other end coupled to the foot lever, 68, at 75, rightward of the standard, 69. Said lever is pivoted to the arm, D, by a bolt, 76. When the free end of the foot lever, 68 is depressed, and the opposite end moves upward, the portion of the lever, 73, at the right of the bolt, 76, is pushed upward, while the portion leftward of said bolt is turned downward. The lever, 73, is made flexible, in order that it may be moved enough to depress the bearing, 52, before the right hand end of the foot lever, 68, reaches its upper limit. This allows the pressure of the upper feed roller upon sheets varying in thickness during a suitable portion of the movement of the foot lever. As will now be understood, the feeding of the sheet to be cut is rearward, for the opposing portions of the upper and lower rollers move rearward when the machine is put into action. When the sheet has been inserted between said rollers and the free end of the foot lever has been depressed, the sheet is clamped by said rollers. Then the reciprocatory cutter moves downward and shears the sheet between the cutting edges of the two cutters. If only the edge of the sheet has been inserted, a piece is thus cut out of said edge and a slot in the sheet is thus started. Before the next stroke of the reciprocatory cutter, the sheet is moved a little way rearward and a cut is again made, and this extends said slot as much as the sheet has been fed forward. A small piece of the sheet is thus freed at each stroke and falls away as a chip. If the sheet is inserted between the two rollers far enough to make the first cut away from the edge of the sheet, the first cut will leave an attached tongue of the material of the sheet, and the succeeding cuts will separate pieces or chips. While the operation is proceeding, the operator may turn the sheet in its horizontal plane as much as may be desired, just as a sheet of cloth is ordinarily turned in feeding it through a sewing machine. It is to be observed that the sheet is held only by the two rollers and the area of such engagement of said rollers is limited and may, for practical purposes, be regarded as a point upon which the sheet may turn. Since the cutting device operates at one side of said turning point, there is some tendency toward the turning of the sheet by the action of the cutting members. But such tendency is so slight and so easily resisted by the operator as to be immaterial.

In the ordinary sheet metal cutting operation, the metal at one side of the cut made by two opposing cutting edges is depressed out of the sheet plane. In my machine, that is the portion of the metal under the reciprocatory cutter. The portion at the other side of the cut is supported by the stationary cutter. If the cut is straight and the portion thus bent down is allowed to remain as a part of the sheet, it bears edgewise against the adjacent upright face of the lower cutter and prevents the turning of the sheet to change the course of the feed of the sheet from a straight line. In my machine the cut is not a single straight cut. It extends into two lines which are parallel to each other and to the course of the feed, and the portion of the sheet between said two lines is depressed out of the sheet plane, thus leaving the metal at each side of the space between said two lines in the sheet plane and presenting substantially continuous edges. (See Figs. 14 and 15). When the cutting is carried across the space between said two lines, the portion between said lines is cut transversely into relatively small pieces, the size of each piece being determined by the distance between said lines and by the distance of feed of the sheet between strokes of the reciprocatory cutter. If the cut does not extend across the space between said two lines, the portion of the sheet between said lines will form a ribbon which is depressed out of the sheet line as fast as the cutting proceeds. In either form, there are two parallel lines along which cuts are made and between which the metal is pressed downward by the reciprocatory cutter. The transverse portion of the cut may be eliminated, when the sheet is relatively thin, by moving the lower cutter rearward (toward the right as viewed in Figs. 6, 8, 9, and 10), so that there is no engagement between the upper cutter and the transverse portion of the cutting edge of the lower cutter. When this is done, the ribbon or tongue formed is to be bent downward fast enough to permit the turning of the sheet. The reciprocatory cutter may be so shaped as to bear down upon the tongue or ribbon in such manner as to bend it downward. When the sheet is relatively thick, the upper cutter may cut chisel-like independently of the stationary cutter. If the cut extends transversely from one of said lines to the other, it is immaterial whether the transverse portion of the cut is straight, curved, or otherwise.

In Fig. 14, the dotted line, $e$, shows the course of feed of the sheet. Such course may be straight or curved. The lines $d, d$, indicate the above-mentioned parallel lines along which cuts are made and between which the metal is removed. Such a cut as is made by the cutter shown by Fig. 6 is indicated by $a$; and the cut is made by the cutters of Figs. 8, 9, and 10 is indicated by $b$; while $c$ indicates the cut made when the portion of the cut which is transverse to the course of feed is omitted.

Fig. 15 shows a section taken transversely on $a$ or $b$ or $c$, the sheet being indicated by $f$ and the portion of the sheet which is cut away being indicated by $g$.

It is to be observed that in the form of the machine herein described, the feed mechanism constantly tends to move the sheet forward. But such forward movement is resisted by the reciprocatory cutter while the latter engages the sheet. Since said cutter is strong and the two rollers which feed the sheet form only frictional engagement therewith, the reciprocatory cutter can arrest the forward movement of the sheet by overcoming such frictional engagement, the sheet again moving forward immediately after the reciprocatory cutter disengages itself from the sheet. Practice has shown that this operation is feasible.

I claim as my invention:

1. In a machine for cutting sheet metal, the combination of a reciprocatory cutter having lateral cutting edge portions extending to two lines which are parallel to each other and to the course of the sheet, and two members, standing in opposition to each other and adapted to receive a metal sheet between them and one being driven, for supporting and feeding said metal sheet and forming a turning point therefor near the path of the reciprocatory cutter, substantially as described.

2. In a machine for cutting sheet metal, the combination of a reciprocatory cutter having lateral cutting edge portions extending to two lines which are parallel to each other and to the course of the sheet, two members, standing in opposition to each other and adapted to receive the metal sheet between them and one being driven, for feeding said metal sheet and forming a turning point therefor close to the path of the reciprocatory cutter, and sheet supporting means at each side of the space inclosed between said two parallel lines and adjacent the path of the reciprocatory cutter, substantially as described.

3. In a machine for cutting sheet metal, the combination of a reciprocatory cutter having lateral cutting edge portions extending to two lines which are parallel to each other and to the course of the sheet, two members, standing in opposition to each other and adapted to receive the metal sheet between them and one being driven, for feeding said metal sheet and forming a turning point therefor close to the path of the reciprocatory cutter, and a lower cutter located below the sheet plane and extending to each side of the space inclosed between said two parallel lines adjacent the path of the reciprocatory cutter, substantially as described.

4. In a machine for cutting sheet metal, the combination of two members, standing in opposition to each other and adapted to receive a metal sheet between them and one being driven, for constantly supporting and frictionally engaging and feeding said metal sheet and forming a turning point therefor, and a reciprocatory cutter having a path passing through the plane of said sheet near said turning point and having lateral cutting edge portions extending to two lines which are parallel to each other and to the course of the sheet, substantially as described.

5. In a machine for cutting sheet metal, the combination of two members, standing in opposition to each other and adapted to receive a metal sheet between them and one being driven, for constantly supporting and frictionally engaging and feeding said metal sheet and forming a turning point therefor, a reciprocatory cutter having a path passing through the plane of said sheet near said turning point, and a lower cutter located below the sheet plane and at the level of the upper portion of the lower feed member and close to said path and having lateral cutting edge portions extending to two lines which are parallel to each other and to the course of the sheet, substantially as described.

6. In a machine for cutting sheet metal, the combination of two members, standing in opposition to each other and adapted to receive a metal sheet between them and one being rotary and driven, for supporting and feeding said metal sheet and forming a turning point therefor, and a reciprocatory cutter having a path passing through the plane of said sheet near said turning point and having lateral cutting edge portions extending to two lines which are parallel to each other and to the course of the sheet, substantially as described.

7. In a machine for cutting sheet metal, the combination of two members, standing in opposition to each other and adapted to receive a metal sheet between them and one being rotary and driven, for supporting and feeding said metal sheet and forming a turning point therefor, a reciprocatory cutter having a path passing through the plane of said sheet near said turning point and having lateral cutting edge portions extending to two lines which are parallel to each other and to the course of the sheet, and a stationary cutter located below the sheet plane and at the level of the upper portion of the lower feed member and close to said path, substantially as described.

8. In a machine for cutting sheet metal, the combination of two rotary members, standing in opposition to each other and adapted to receive a metal sheet between them and one being driven, for supporting and feeding said metal sheet and forming a turning point therefor, and a reciprocatory cutter having a path passing through the plane of said sheet near said turning point and having lateral cutting edge portions extending to two lines which are parallel to each other and to the course of the sheet, substantially as described.

9. In a machine for cutting sheet metal, the combination of two rotary members, standing in opposition to each other and adapted to receive a metal sheet between them and one being driven, for supporting and feeding said metal sheet and forming a turning point therefor, a reciprocatory cutter having a path passing through the plane of said sheet near said turning point and having lateral cutting edge portions extending to two lines which are parallel to each other and to the course of the sheet, and a stationary cutter located below the sheet plane and at the level of the upper portion of the lower rotary feed member and close to said path, substantially as described.

10. In a machine for cutting sheet metal, the combination of two rotary members, standing in opposition to each other and adapted to receive a metal sheet between them and one being driven, for constantly supporting and frictionally engaging and feeding said metal sheet and forming a turning point therefor, and a reciprocatory cutter having a path passing through the plane of said sheet near said turning point and having lateral cutting edge portions extending to two lines which are parallel to each other and to the course of the sheet, substantially as described.

11. In a machine for cutting sheet metal, the combination of two rotary members, standing in opposition to each other and adapted to receive a metal sheet between them and one being driven, for constantly supporting and frictionally engaging and feeding said metal sheet and forming a turning point therefor, a reciprocatory cutter having a path passing through the plane of said sheet near said turning point and having lateral cutting edge portions extending to two lines which are parallel to each other and to the course of the sheet, and a stationary cutter located below the sheet plane and at the level of the upper portion of the lower feed member and close to said path, substantially as described.

12. In a machine for cutting sheet metal, the combination of a stationary cutting member, adjusting screws at each side of said member, a reciprocatory cutting member having lateral cutting edge portions extending to two lines which are parallel to each other and to the course of the sheet, and feed members for engaging a sheet and forming a turning point therefor close to the cutting edge of the stationary cutting member, substantially as described.

13. In a machine for cutting sheet metal, the combination of a reciprocatory cutting member having lateral cutting edge portions extending to two lines which are parallel to each other and to the course of the sheet, fixed guides for said member, two feed rollers having their axes parallel to each other and perpendicular to the path of the reciprotory cutter, and a stationary cutting member adjustable in a course parallel to the axes of said feed rollers, substantially as described.

14. In a machine for cutting sheet metal, the combination of a reciprocatory cutting member having lateral cutting edge portions extending to two lines which are parallel to each other and to the course of the sheet, fixed guides for said member, two feed rollers having their axes parallel to each other and perpendicular to the path of the reciprocatory cutter, and the lower of said rollers being adjustable in a course parallel to its axis, and a stationary cutting member adjustable in a course parallel to the axes of said feed rollers, substantially as described.

15. In a machine for cutting sheet metal, the combination of a reciprocatory cutting member having lateral cutting edge portions extending to two lines which are parallel to each other and to the course of the sheet, a lower feed roller, a shaft supporting said roller, a fixed support, and a stationary cutting member supported by said support and by said shaft, substantially as described.

16. In a machine for cutting sheet metal, the combination of cutting members, a pair of feed rollers, power-actuated means for driving said cutting members and said rollers, and a means controllable by the operator and in operative relation with said actuating means and said rollers for setting said actuating means into operation and moving said rollers toward each other, substantially as described.

17. In a machine for cutting sheet metal, the combination of feed members for engaging the faces of a metal sheet and forming a turning point therefor, and cutting members located close to said turning point and adapted to cut and move the sheet metal out of the sheet plane between parallel lines which are parallel to the course of feed of the sheet, substantially as described.

18. In a machine for cutting sheet metal, the combination of rotary feed members for engaging the faces of a metal sheet and forming a turning point therefor, and cutting members located close to said turning point and adapted to cut and move the sheet metal out of the sheet plane between parallel lines which are parallel to the course of feed of the sheet, substantially as described.

19. In a machine for cutting sheet metal, the combination of feed members for engaging the faces of a metal sheet and forming a turning point therefor, and a stationary cutting member and a reciprocatory cutting member located close to said turning point and adapted to cut and move the sheet metal out of the sheet plane between parallel lines which are parallel to the course of feed of the sheet, substantially as described.

20. In a machine for cutting sheet metal, the combination of rotary feed members for engaging the faces of a metal sheet and forming a turning point therefor, and a stationary cutting member and a reciprocatory cutting member located close to said turning point and adapted to cut and move the sheet metal out of the sheet plane between parallel lines which are parallel to the course of feed of the sheet, substantially as described.

21. In a machine for cutting sheet metal, the combination with a reciprocatory cutter having lateral cutting edge portions extending to two lines which are parallel to each other and to the course of the sheet, of constantly-acting feeding mechanism adapted to yieldingly engage a sheet of metal with less force than the force with which the sheet is engaged by the reciprocatory cutter, whereby the movement of the sheet is made intermittent, the action of said feeding mechanism being overcome and the sheet held against forward movement during each engagement of the sheet by the reciprocatory cutter, substantially as described.

22. In a machine for cutting sheet metal, the combination with a reciprocatory cutter having lateral cutting edge portions extending to two lines which are parallel to each other and to the course of the sheet, of rotary, constantly-acting feeding mechanism adapted to yieldingly engage a sheet of metal with less force than the force with which the sheet is engaged by the reciprocatory cutter, whereby the movement of the sheet is made intermittent, the action of said feeding mechanism being overcome and the sheet held against forward movement during each engagement of the sheet by the reciprocatory cutter, substantially as described.

23. In a machine for cutting sheet metal, the combination with a reciprocatory cutter having lateral cutting edge portions extending to two lines which are parallel to each other and to the course of the sheet, of an upper and a lower feed roller constantly rotating and adapted to yieldingly engage a sheet of metal with less force than the force with which the sheet is engaged by the reciprocatory cutter, whereby the movement of the sheet is made intermittent, the action of said rollers being overcome and the sheet held against forward movement during each engagement of the sheet by the reciprocatory cutter, substantially as described.

In testimony whereof I have signed my name, in presence of two witnesses, this 30th day of November, in the year one thousand nine hundred and twelve.

CHARLES B. GRAY.

Witnesses:
 CYRUS KEHR,
 GEO. C. SMITH.